(12) United States Patent
Knuuttila et al.

(10) Patent No.: US 11,774,547 B2
(45) Date of Patent: Oct. 3, 2023

(54) SELF-POSITIONING METHOD, SELF-POSITIONING SYSTEM AND TRACKING BEACON UNIT

(71) Applicant: LAC CAMERA SYSTEMS OY, Espoo (FI)

(72) Inventors: Jouni Knuuttila, Espoo (FI); Sami Lahtinen, Helsinki (FI)

(73) Assignee: LAC CAMERA SYSTEMS OY, Espoo (FI)

( * ) Notice: Subject to any disclaimer, the term of this patent is extended or adjusted under 35 U.S.C. 154(b) by 295 days.

(21) Appl. No.: 17/338,006

(22) Filed: Jun. 3, 2021

(65) Prior Publication Data
US 2021/0286044 A1  Sep. 16, 2021

Related U.S. Application Data

(63) Continuation of application No. PCT/FI2018/050871, filed on Dec. 3, 2018.

(51) Int. Cl.
*G01S 5/12* (2006.01)
*B64C 39/02* (2023.01)
(Continued)

(52) U.S. Cl.
CPC .............. *G01S 5/12* (2013.01); *B64C 39/024* (2013.01); *G06F 18/25* (2023.01); *G08G 5/0091* (2013.01);
(Continued)

(58) Field of Classification Search
CPC ........ G01S 5/12; G01S 2205/01; G01S 3/043; G01S 5/02585; G01S 3/14; G01S 3/46;
(Continued)

(56) References Cited

U.S. PATENT DOCUMENTS 3,856,104 A   12/1974  Ohba
8,010,287 B1 *  8/2011  Frank ..................... G01S 5/12
                                                      701/470
(Continued)

FOREIGN PATENT DOCUMENTS

CN       102033220 A   *  4/2011
CN       105424030 A   *  3/2016  ........... G01C 21/165
(Continued)

OTHER PUBLICATIONS

International Search Report for PCT/FI2018/050871 dated Nov. 8, 2019, 6 pages.

*Primary Examiner* — Mahendra R Patel
(74) *Attorney, Agent, or Firm* — NIXON & VANDERHYE (57) ABSTRACT

The present disclosure describes a self-positioning system, a tracking beacon and a self-positioning method for a vehicle. The self-positioning system is configured to estimate an direction of arrival of a radio wave tracking beacon signal arriving at an antenna array of the vehicle from a non-stationary tracking beacon unit, estimate Euclidian distance between the self-positioning system and the tracking beacon unit by using wireless radio-frequency communication between the self-positioning system and the tracking beacon unit, and determine position data identifying a three-dimensional position of the self-positioning system with respect to tracking beacon unit on the basis of the estimates of the direction of arrival and the Euclidian distance.

8 Claims, 4 Drawing Sheets

(51) Int. Cl.
*G08G 5/00* (2006.01)
*G06F 18/25* (2023.01)
*B64U 101/00* (2023.01)

(52) U.S. Cl.
CPC .... *B64U 2101/00* (2023.01); *B64U 2201/104* (2023.01)

(58) Field of Classification Search
CPC ... G01S 5/0257; G01S 5/0284; B64C 39/024; G06F 18/25; G08G 5/0091; G08G 5/0069; B64U 2101/00; B64U 2201/104; B64U 2201/00; B64D 39/00; G05D 1/102; G05D 1/12
USPC ...................................................... 455/456.1
See application file for complete search history.

(56) References Cited

U.S. PATENT DOCUMENTS

| | | | |
|---|---|---|---|
| 8,160,604 B2 | 4/2012 | Gaal | |
| 8,712,686 B2 * | 4/2014 | Bandyopadhyay | G01C 17/38 |
| | | | 701/445 |
| 11,016,167 B2 * | 5/2021 | Przybyla | G06F 3/00 |
| 11,158,142 B2 * | 10/2021 | Chen | G01S 5/0063 |
| 2007/0197229 A1 * | 8/2007 | Kalliola | G01S 3/46 |
| | | | 455/456.1 |
| 2008/0004796 A1 * | 1/2008 | Schott | G01C 21/005 |
| | | | 701/434 |
| 2008/0077326 A1 * | 3/2008 | Funk | G01S 19/49 |
| | | | 701/500 |
| 2017/0099424 A1 * | 4/2017 | Jones | H04N 23/66 |
| 2017/0195855 A1 | 7/2017 | Na et al. | |
| 2017/0350961 A1 * | 12/2017 | Hill | G01S 5/0036 |
| 2017/0371353 A1 * | 12/2017 | Millinger, III | G05D 1/0094 |
| 2018/0356492 A1 * | 12/2018 | Hamilton | G01S 13/76 |
| 2019/0361460 A1 * | 11/2019 | Medeiros | G05D 1/00 |

FOREIGN PATENT DOCUMENTS

| | | | | |
|---|---|---|---|---|
| CN | 107300398 A | * | 10/2017 | |
| CN | 108351654 A | * | 7/2018 | .......... B64C 39/024 |
| CN | 109269471 B | * | 7/2021 | .......... G01C 21/165 |
| EP | 2630513 B1 | * | 1/2021 | ............ A61B 5/002 |
| EP | 3500903 B1 | * | 4/2021 | ............ G05D 1/106 |
| WO | WO-2006079439 A2 | * | 8/2006 | .......... G01S 5/0257 |
| WO | WO-2007107315 A1 | * | 9/2007 | ......... G06K 9/00369 |
| WO | WO-2010000254 A2 | * | 1/2010 | .......... G01S 13/343 |
| WO | WO-2017180698 A1 | * | 10/2017 | ........... A61B 5/1113 |

* cited by examiner

SELF-POSITIONING METHOD, SELF-POSITIONING SYSTEM AND TRACKING BEACON UNIT

This application is a continuation of PCT/FI2018/050871 filed Dec. 3, 2018 which designated the U.S., the entire contents of which are hereby incorporated by reference.

FIELD

The invention relates to vehicles, and in particular, to self-positioning features of vehicles.

BACKGROUND INFORMATION

Developments in unmanned vehicles have enabled new kind of tracking applications, where an unmanned vehicle physically tracks a target, such as a person. However, when the unmanned vehicle does not operate in a controlled environment and/or if the target does not move in a predictable manner, tracking the target reliably and safely may be a difficult task. Therefore implementation of the tracking features may not be sufficiently fast, robust, and/or accurate, in particular in outdoor use.

BRIEF DISCLOSURE

An object of the present disclosure is to provide a self-positioning method and means for implementing the method so as to alleviate the above disadvantages. The object of the disclosure is achieved by a self-positioning method and system which are characterized by what is stated in the independent claims. The preferred embodiments of the disclosure are disclosed in the dependent claims.

A self-positioning method according to the present disclosure utilizes a self-positioning system together with a tracking beacon unit. The self-positioning system is configured to wirelessly communicate with the tracking beacon unit (i.e. a tag). The self-positioning system estimates a direction of arrival of a wireless communication signal from the tag, a Euclidian distance between the self-positioning system and the tag, and a height difference between the self-positioning system and the tag.

With the three parameters, i.e. the direction of arrival, the Euclidian distance, and the height difference, the self-positioning system is able to calculate its position with respect to the tag in more than one way. This redundancy provides robustness to the operation of the self-positioning system. For example, because of the redundancy, an estimate of the position can be calculated even if a signal determining one of the three parameters is temporarily lost. Further, as there may be a plurality of ways to estimate the position or its parameters, more accurate estimates may be determined on the basis of a plurality of estimates. Any of the above-mentioned three parameters can be measured and/or estimated in a plurality of ways. These measurements and/or estimates of a parameter can be combined into a more accurate estimate of the parameter and this more accurate estimate may then be used when determining the final estimate of the position.

In addition, the self-positioning method and system according to the present disclosure is able to update its position with respect to the tracking beacon unit very quickly. Equipped with a system according to the present disclosure, a vehicle is able to accurately track a target even at a close proximity.

BRIEF DESCRIPTION OF THE DRAWINGS

In the following the invention will be described in greater detail by means of preferred embodiments with reference to the attached drawings, in which.

DETAILED DISCLOSURE

The present disclosure describes a self-positioning method and a self-positioning system of a vehicle and a tracking beacon unit co-operating with the self-positioning system. In this context, "vehicle" refers to a movable device. Preferably, but not necessarily, a vehicle is self-propelled. A vehicle may or may not carry payload, cargo or persons. It may be manned or unmanned. Automobiles, aircrafts, marine vessels, and even space crafts are some examples of vehicles. Further, in the context of the present disclosure, a vehicle can be understood as a device that can change its orientation or posture, such as a self-rotating display or a robotic arm.

A self-positioning method and system according to the present disclosure is particularly well suited for unmanned vehicles. In the following, the self-positioning method and system are mostly discussed in relation to an unmanned vehicle. However, the following disclosure is also applicable to other forms of vehicles.

The unmanned vehicle may be an unmanned aerial vehicle (UAV), i.e. a drone, for example. The UAV may be a light-weight quadcopter, for example. Further, the unmanned vehicle may also be an unmanned ground vehicle (UGV) or an unmanned maritime vehicle (UMV). The self-positioning system is configured to wirelessly communicate with a non-stationary tracking beacon unit (i.e. a tag). In this context, "non-stationary" refers to something that is not fixed to a specific location. In other words, "non-stationary" is something that is intended to be movable. A self-positioning method and system according to the present disclosure are able to track a non-stationary target equipped with the tracking beacon unit with high accuracy and reliability on a broad range of tracking distances. This allows applications where an unmanned vehicle with the self-positioning system is able to follow the target accurately even at a very close proximity, such as a meter, or even a half meter, away from the target. At the other extreme, the self-positioning system allows positioning at a long range, such as 200 meters away, or even 1000 meters away from the target.

The non-stationary tracking beacon unit is configured to emit a radio-frequency tracking beacon signal to be received by an antenna array connected to a self-positioning system, and the self-positioning is configured to estimate a direction of arrival of a radio wave tracking beacon signal arriving at the antenna array. In the context of the present disclosure, "antenna array" refers to an assembly of antenna elements that are configured to determine a single direction of arrival of a radio wave tracking beacon signal emitted by a non-stationary tracking beacon unit. Self-positioning according to the present disclosure can be performed with a single antenna array. The tracking beacon unit also wirelessly communicates with the self-positioning system in order to determine Euclidian distance between the self-positioning system and the tracking beacon unit.

Further, the tracking beacon unit may wirelessly transmit atmospheric pressure data on the atmospheric pressure at the location of the tracking beacon unit to the self-positioning system. The atmospheric pressure at position of the tracking beacon unit may in this context be understood as the atmospheric pressure at the tracking beacon's current altitude (i.e. elevation).

The self-positioning system may also measure atmospheric pressure at the location of the self-positioning system. The atmospheric pressure at position of the self-positioning unit may be understood as the atmospheric pressure at the self-positioning unit's current altitude (i.e. elevation).

With the two atmospheric pressure values, the self-positioning system may estimate a height difference between the self-positioning system and the tracking beacon unit. The self-positioning system may then determine position data identifying coordinates of the self-positioning system with respect to tracking beacon unit in a three-dimensional space on the basis of the estimates of the direction of arrival, the Euclidian distance, and the height difference.

Figure 1:
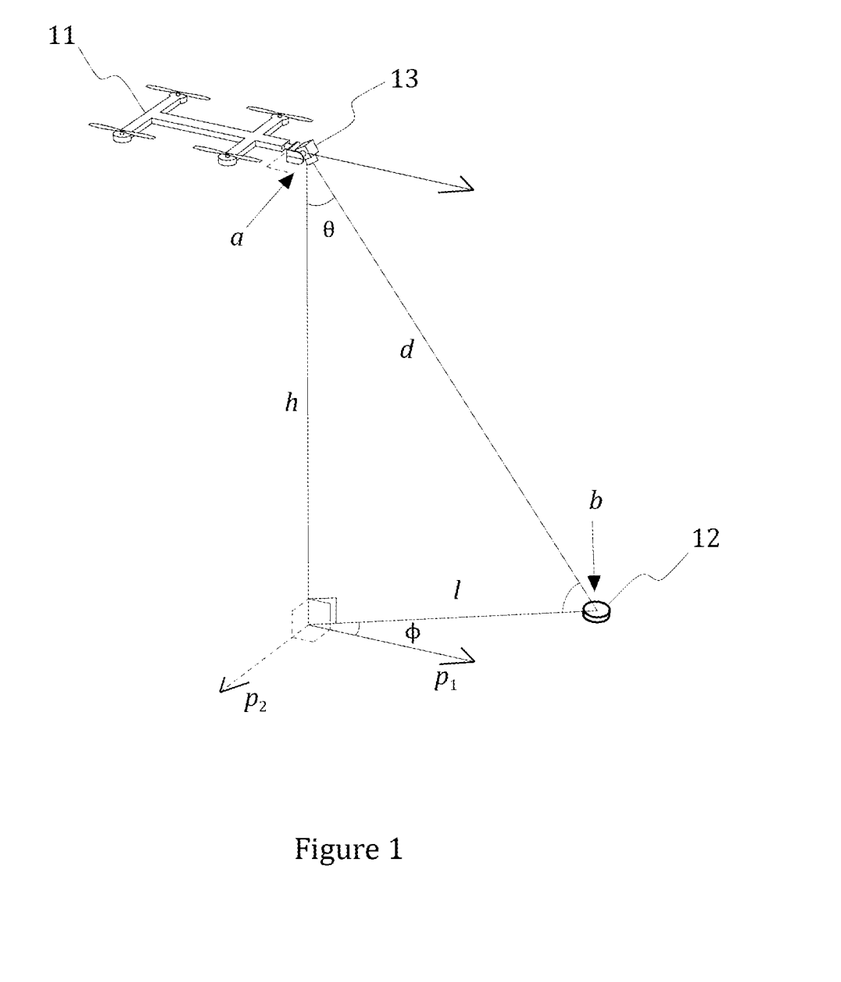
FIG. 1 shows an UAV and a tracking beacon unit.

In the following paragraphs, definitions of the direction of arrival, the height difference, the Euclidian distance and other relevant concepts are discussed in more detail in reference to FIG. 1 that shows an UAV 11 and a non-stationary tracking beacon unit 12.

In the context of the present disclosure, a reference point, e.g. an origin, of an object may be an arbitrarily or otherwise selected, fixed point with respect to the object. For example, the reference point may be located at the centre of gravity or at an axis/plane of symmetry of the object. FIG. 1 shows an exemplary reference point a of the UAV 11 and an exemplary reference point b of the tracking beacon unit 12. In FIG. 1, a camera 13 has been mounted on a gimbal on one side of the UAV 11, and the reference point a is centred at the rotational axes of the gimbal. The UAV may be configured to point the camera 13 towards the tracking beacon unit 12, for example.

In the context of the present disclosure, a height difference between objects refers to a distance between the reference points of the objects along a height axis that is parallel to the direction of Earth's gravity. In FIG. 1, the height difference is shown as distance h. In the present disclosure, unless otherwise indicated, direction "down" refers to a direction parallel to the direction of Earth's gravity and pointing to the centre of Earth. In the context of the present disclosure, the Euclidian distance (or simply "distance") between objects is represented by a distance between the reference points of the objects. In FIG. 1, the Euclidian distance between reference points a and b is shown as distance d. The distance may be measured in various ways.

In the context of the present disclosure, a horizontal plane refers to a plane that is perpendicular to the direction of Earth's gravity and to the height h. In FIG. 1, two non-parallel directions $p_1$ and $p_2$, that are both perpendicular to height h, together define such a horizontal plane. The distance between the UAV 11 and the tracking beacon unit 12 along the horizontal plane is shown as clearance l. A vertical plane is any plane that is perpendicular to the parallel plane. In the context of the present disclosure, a "tracking plane" is a vertical plane that contains the reference points of both the self-positioning system and the tracking beacon unit. In other words, the tracking plane also contains a direct line d between the reference points. In FIG. 1, the lines d, h, and l define a tracking plane.

In addition to the reference point, a reference direction is defined for the self-positioning system. The reference direction may be an arbitrarily or otherwise selected direction extending in a horizontal plane. For example, the reference direction may be aligned with an axis of symmetry of the frame of the unmanned vehicle. In FIG. 1, direction $p_1$ may represent a reference direction for the UAV 11, for example. Direction $p_1$ points perpendicularly away from the side of the UAV 11 that has the camera 13 mounted on.

In the context of the present disclosure, the term "direction of arrival" may be a composite of an elevation angle $\theta$ and an azimuth angle $\phi$, because the tracking beacon unit 12 may not be aligned to the reference direction $p_1$. As shown in FIG. 1, the elevation angle $\theta$ may be the angle between the height h and the line d between the reference points in the tracking plane and the azimuth angle $\phi$ may be the angle between the tracking plane and a reference direction $p_1$ of the self-positioning system.

Figure 2:
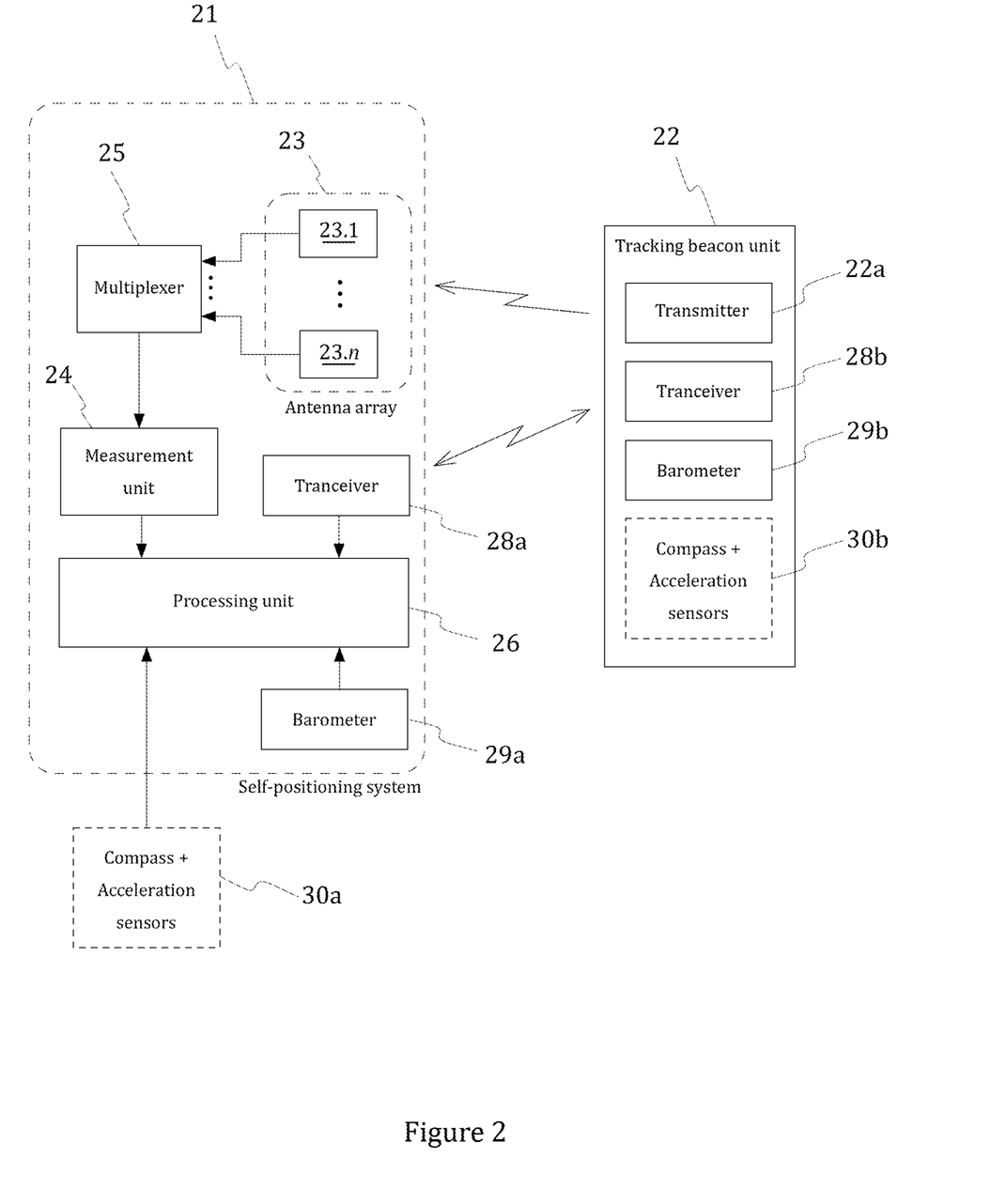
FIG. 2 shows a simplified block diagram of an exemplary embodiment of an arrangement with a self-positioning system according to the present disclosure.

In the following paragraphs, aspects of a self-positioning system and a tracking beacon unit according to the present disclosure are discussed in reference to FIG. 2. FIG. 2 shows a simplified block diagram of an exemplary embodiment of an arrangement with a self-positioning system according to the present disclosure. The arrangement in FIG. 2 comprises the self-positioning system 21 and a tracking beacon unit 22. The self-positioning system comprises a single antenna array 23, and the tracking beacon unit 22 comprises a transmitter 22a emitting a radio-frequency signal to be received by the antenna array 23.

In order to be able to determine the direction of arrival of a radio-frequency signal transmitted by the tracking beacon unit 22, the antenna array 23 comprises a plurality of antenna elements 23.1 to 23.n. The inventors have found out that good results in determining the direction of arrival can be achieved by using an arrangement where signals from antenna elements of the antenna array are multiplexed to a measurement unit that samples the signals at a high speed. The direction of arrival may then be determined based on the phase (and, in some embodiments, amplitude) differences of signals received by antenna elements of the antenna array. One example of such an arrangement is disclosed in US patent application US 2007/0197229 A1 which is hereby incorporated by reference. Paragraphs [0061]-[0069] of US 2007/0197229 A1 discuss the general concept of determining the direction of arrival. Paragraphs [0072]-[0074] discuss some exemplary implementations of the concept of US 2007/0197229 A1.

In FIG. 2, signals from the antenna elements 23.1 to 23.n are multiplexed to a measurement unit 24 through a multiplexer unit 25. The measurement unit may provide the samples of the signals from the antenna elements 23.1 to 23.n to a processing unit. In FIG. 2, the measurement unit provides the samples to a processing unit 26 that may comprise a computing device (e.g. a processor, a DSP, an FPGA or an ASIC) coupled with memory, for example. Based on the samples, the processing unit 26 may then determine the direction of arrival based on the phase (and, in some embodiments, amplitude) differences of signals received by the antenna elements 23.1 to 23.n.

In some embodiments, also the tracking beacon unit 22 may include an antenna array that utilizes the above-discussed concept and may be used to provide supplementary directional information.

The self-positioning system may estimate the Euclidian distance between the self-positioning system and the tracking beacon unit by using wireless radio-frequency communication between the self-positioning system and the tracking beacon unit. In FIG. 2, the self-positioning system and the tracking beacon unit comprise wireless transceivers 28a and 28b forming a transceiver pair that performs a time-of-flight measurement on the transmitted signal for determining the Euclidian distance between the transceivers.

The concept of forming an estimate of the Euclidian distance between the reference points wirelessly based on time of flight of a distance-detection signal is known in many fields of technology. However, the inventors have found out that, in the field of self-positioning of unmanned vehicles, the distance-detection signal should preferably be a radio-frequency signal. While other kind of signals, such as audio or light signals, may be used, a radio-frequency signal provides improved robustness. In a non-controlled environment, such as outdoors, other types of signals, such as ultrasound signals or infrared light signals, may suffer from interferences, because fluctuating ambient audio and light noise levels may be present. Furthermore, ultrasound and infrared light signals are both significantly attenuated by obstructions.

While an estimate of the Euclidian distance can be determined by using the same radio-frequency signal that is used for determining the direction of arrival (or alternatively, from calculations based on the estimates of direction of arrival and the height difference), further advantages in robustness, fault tolerance and accuracy of the determined position can be achieved by using separate means and optimized signal forms for determining the Euclidian distance. When the distance is determined separately, a desired redundancy is introduced to the system. Further, the accuracy of the positioning can be maximized as each signal is optimized for its task. Therefore, use of separate means for determining the Euclidian distance is preferable.

In FIG. 2, the self-positioning system 21 and the tracking beacon unit 22 both comprise a wireless radio-frequency transceiver unit which together form a distance-detecting transceiver pair. The transceiver units of the transceiver pair may be configured to wirelessly signal with each other with radio waves in order to determine the Euclidian distance between each other. Alternatively, in some embodiments, an arrangement with a radar transmitter/receiver and a passive reflector/active beacon may be used.

In FIG. 2, the self-positioning system 21 and the tracking beacon unit 22 comprise barometer units 29a and 29b, respectively. The self-positioning system 21 may wirelessly receive atmospheric pressure data from the tracking beacon unit 22. Said atmospheric pressure data may be carried by the tracking beacon signal and/or by the signal between the transceivers 28a and 28b of the distance-detecting transceiver pair, for example. The atmospheric pressure data indicates atmospheric pressure at the location of the tracking beacon unit. The self-positioning system 21 may use its barometer 29a to determine atmospheric pressure at the location of the self-positioning system 21.

Once the self-positioning unit has atmospheric pressure data on the atmospheric pressures at the locations of both the self-positioning system 21 and the tracking beacon unit 22, the self-positioning system may estimate a relative height difference between the self-positioning system and the tracking beacon unit based on atmospheric pressure data on the atmospheric pressures at the locations of the self-positioning system and the tracking beacon unit. For example, in FIG. 2, the processing unit 26 may receive the atmospheric pressure data and calculate the height difference based on the atmospheric pressure data. The self-positioning system 21 may then determine position data identifying a three-dimensional position of the self-positioning system with respect to tracking beacon unit on the basis of the estimates of the direction of arrival, the Euclidian distance, and the height difference. In FIG. 2, the processing unit 26 may be configured to also determine the three-dimensional position data.

While FIG. 2 shows a single processing unit 26, the self-positioning system may also be implemented in various other ways. For example, functionalities of the system as described may be distributed to a plurality of processing units. The position data may be in the form of coordinates of the self-position system with respect to the tracking beacon unit (or with respect to a reference point of the tracking beacon unit). Alternatively, the position data may represent coordinates of the tracking beacon unit with respect to the self-positioning system.

The self-positioning system 21 in FIG. 2 has redundancy in its measurements. In the tracking plane, any missing parameter in a parameter group comprising the height difference, the Euclidian distance and the elevation angle can be resolved on the basis of the two other parameters. For example, an estimate of the height difference can be resolved on the basis of the elevation angle and the Euclidian distance. In a similar manner, an estimate of the elevation angle can be resolved on the basis of the height difference and the Euclidian distance. Further, an estimate of the Euclidian distance can be resolved on the basis of the height difference and the elevation angle. In this manner, the position data in the tracking plane can still be resolved even if one of the three parameters is temporarily missing.

Thus, determining the position data may comprise calculating a plurality of estimates of the three-dimensional position in the self-positioning system 21 of FIG. 2. The estimates of the three-dimensional position may be based on different combinations of the estimates of the direction of arrival, the Euclidian distance, and the height difference. The three-dimensional position of the self-positioning system 21 with respect to the tracking beacon unit 22 may be determined on the basis of the plurality of estimates of the three-dimensional position. For example, the processing unit 26 in FIG. 2 may be programmed to implement a simple form of artificial intelligence for performing a selection logic based on real time information available from the involved sub-systems, such as "packet lost" or "sensor reading out of range". Further, accuracy of the self-positioning system can be improved by combining measurements and estimates originating from the different sub-systems into a more accurate estimate. For example, the self-positioning system may be configured to fuse a first estimate of height difference calculated from the atmospheric pressures and a second estimate of the height difference calculated from the estimates of the direction of arrival and the Euclidian distance into a more accurate estimate of the height difference. Sensor fusion, e.g. in the form of a Kalman filter, can be utilized to fuse different measurements and estimates of the same parameter into a final, accurate estimate of said parameter. For example, an extended Kalman filter with inputs from two or more of the sub-systems can be implemented in order to provide sensor fusion (or, as mentioned above, dynamic redundancy).

In addition to being accurate and reliable, the self-positioning system according to the present disclosure is also fast. It is able to update its position data at a high sampling rate compared with other positioning systems typically used in unmanned vehicles. For example, a self-positioning system according to the present disclosure may be configured to update its position data at less than 10 ms interval or even at less than 5 ms interval. Therefore, the self-positioning system may also be used in applications where unmanned vehicles track a fast-moving target at a very close proximity, such as within 5 m from the target, e.g. as close as at 1 m from the target, or even at 0.5 m from the target. Further, the self-positioning is able to operate at a long range, such as at 200 m from the target or even at 1000 m from the target. Thus the operating range may be 0.5 m to 200 m from the target, or even 0.5 m to 1000 m from the target. In this context, the term "tracking" may be understood as maintaining awareness of the tracking beacon unit's coordinates with respect to the self-positioning unit in a three-dimensional space or maintaining awareness of the self-positioning system's coordinates with respect to the tracking beacon unit in a three-dimensional space. This kind of tracking may be utilized in an application where an unmanned vehicle is configured to keep a camera of the unmanned vehicle pointed at a target carrying a tracking beacon unit while at the same time maintaining a pre-defined (e.g. user-defined) height difference and horizontal clearance between the unmanned vehicle and the target. In order to facilitate the camera tracking, the camera may be mounted on a three-axis gimbal on the unmanned vehicle. Alternatively, the gimbal may be a two-axis gimbal and an additional degree of freedom is provided through the control of the yaw of the unmanned vehicle itself. The camera may be used to capture images or video at visible wavelengths of light, for example. In addition, or alternatively, the camera may be configured for thermal imaging, for example.

The applications for a positioning system according to the present disclosure are not limited to camera systems. For example, an unmanned vehicle with a positioning system according to the present disclosure may be used to point a directional microphone, a directional speaker, and/or a directional spotlight mounted on the unmanned vehicle towards a target carrying a tracking beacon unit.

The unmanned vehicle may also be configured to carry a payload. For example, an UAV comprising a self-positioning system according to the present disclosure may be used to deliver packets directly to a target (e.g. a person) carrying a tracking beacon unit according to the present disclosure. The UAV may use GPS and/or mobile phone network for determining the approximate location of the target and for navigating to the approximate location. Once the UAV is within operating range of the self-positioning system, the UAV may use the self-positioning system to deliver the packet at the exact location of the user.

Further, the unmanned vehicle may carry at least one actuator for performing a function. The actuator may use the tracking beacon as a reference point. For example, the unmanned vehicle may comprise a self-positioning system and a robotic arm, and the unmanned vehicle may be configured to grab a target carrying a tag according to the present disclosure. A self-positioning system according to the present disclosure may also be used for setting up a minimum safety height difference between the system and a tracking beacon unit. This may be particularly useful in UAV applications where an UAV provided with a self-positioning system according to the present disclosure tracks a target (e.g. a person) carrying a tracking beacon unit according to the present disclosure. By defining and maintaining the set minimum height difference, impacts between the UAV and the target can be avoided. Atmospheric pressure data of an UAV with self-positioning system according to the present disclosure may be used to keep the UAV below a maximum flight altitude defined by national/regional legislation.

In addition to the above-discussed three parameters, the self-positioning system may be further configured to maintain awareness of its geographic direction and vertical and horizontal accelerations. In other words, the system is able to maintain its awareness of a direction fixed to the surrounding landscape. For example, the geographic direction may be a cardinal direction, such as the magnetic north.

The self-positioning system may have access to data from an inertial navigation unit (INU) of the unmanned vehicle, for example. The inertial navigation unit may comprise at least one acceleration sensor, a gyroscope, and/or a compass, for example. In FIG. 2, the processing unit 26 may receive orientation data from an inertial navigation unit 30a comprising at least compass and one or more acceleration sensors. In a similar manner, the tracking beacon unit 22 in FIG. 2 may comprise an optional inertial navigation unit 30b that provides cardinal direction and vertical and horizontal acceleration data. On the basis of the determined three-dimensional position and geographic direction data originating from the gyroscope and/or the compass, the self-positioning system is able the maintain awareness of a geographic direction. However, the geographic direction is not limited to cardinal directions. For example, the geographic direction may be any arbitrarily or otherwise chosen direction in the horizontal plane, fixed to the landscape.

With the added awareness of the geographic direction, a self-positioning system according to the present disclosure is able to maintain a desired geographic dislocation with respect to a target carrying a tracking beacon unit. In the context of the present disclosure, a geographic dislocation may be understood as a desired distance along a desired geographic direction. For example, an unmanned vehicle may be configured to track a target at a fixed distance in a desired cardinal direction from the target. In some embodiments, the self-positioning system may track the orientation of the tracking beacon unit. For example, the cardinal orientation of the tracking beacon unit may be used to control the relative position of an unmanned vehicle carrying the self-positioning system with respect to the tracking beacon unit. Further, with the awareness of the geographic direction, a self-positioning system according to the present disclosure is also able to maintain a desired position with respect to the direction of movement of the target. For example, an unmanned vehicle equipped with the self-positioning system may be configured to stay at a fixed distance on the left side (or any other side) of a target as the target advances. In addition, with the awareness of the geographic direction, a self-positioning system according to the present disclosure is able to reliably follow a path relative to position or movement of a target with a tracking beacon unit.

Further, the accuracy of the estimated distance between the self-positioning system and the tracking beacon unit along the horizontal plane (e.g. clearance l in FIG. 1) can be improved with sensor fusion when the self-positioning system and the tracking beacon are both equipped with inertial navigation units capable of determining the geographic direction and accelerations in the horizontal plane. Suitable sensor fusion algorithm, such as a Kalman filter, can then be used to fuse the acceleration difference, observed by the inertial navigation units in the horizontal plane (i.e. difference calculated from accelerations parallel to clearance in FIG. 1), and a horizontal distance estimate determined from the elevation angle and the Euclidian distance provided by the self-positioning system. For example, a self-positioning system according to the present disclosure may be configured to wirelessly receive acceleration data from the tracking beacon unit. Said acceleration data indicates horizontal accelerations of the tracking beacon unit. The self-positioning system may be configured to also determine horizontal acceleration data of the self-positioning system, and then determine a horizontal acceleration difference between the self-positioning system and the tracking beacon unit based on the acceleration data of the self-positioning system and the tracking beacon unit. A horizontal distance estimate between the self-positioning system and the tracking beacon unit may then be determined based on the direction of arrival and the Euclidian distance, and an enhanced horizontal distance estimate may be calculated based on the horizontal acceleration difference and the horizontal distance estimate with suitable sensor fusion calculation. The position data identifying a three-dimensional position of the self-positioning system with respect to tracking beacon unit may then be determined based on the estimates of the direction of arrival, the sensor fusion horizontal distance, and an estimate of the height difference between the system and the tracking beacon unit. As discussed earlier, the height difference may be determined using the estimates of the Euclidian distance and the elevation angle and/or the difference between the atmospheric pressures of the system and the tracking beacon unit.

Sensor fusion can also be utilised to improve the accuracy of the estimate of the azimuth angle ϕ i.e. the angle between the tracking plane and the reference direction of the self-positioning system provided that the self-positioning system has an inertial navigation unit capable of determining the geographic direction and rotation of the self-positioning system perpendicular to horizontal plane and that the tracking beacon has an inertial navigation unit capable of determining the geographic direction and accelerations in the horizontal plane. Suitable sensor fusion algorithm, for example a Kalman filter, can then be implemented to fuse the difference of orbital angular acceleration of the self-positioning system determined at radius l and the tracking beacon's acceleration in the horizontal plane perpendicular to clearance l in FIG. 1, and the estimate of the azimuth angle ϕ angle determined by the self-positioning system from the direction of arrival of the radio-frequency signal in the horizontal plane.

The self-positioning system according to the present disclosure may be utilized in many applications. Because a system according to the present disclosure is fast, reliable and accurate, it can be used for tracking targets that move fast and/or in unpredictable manner. For example, the system may be used for filming performance of an athlete, e.g. a snowboarder on a slope.

Figure 3:
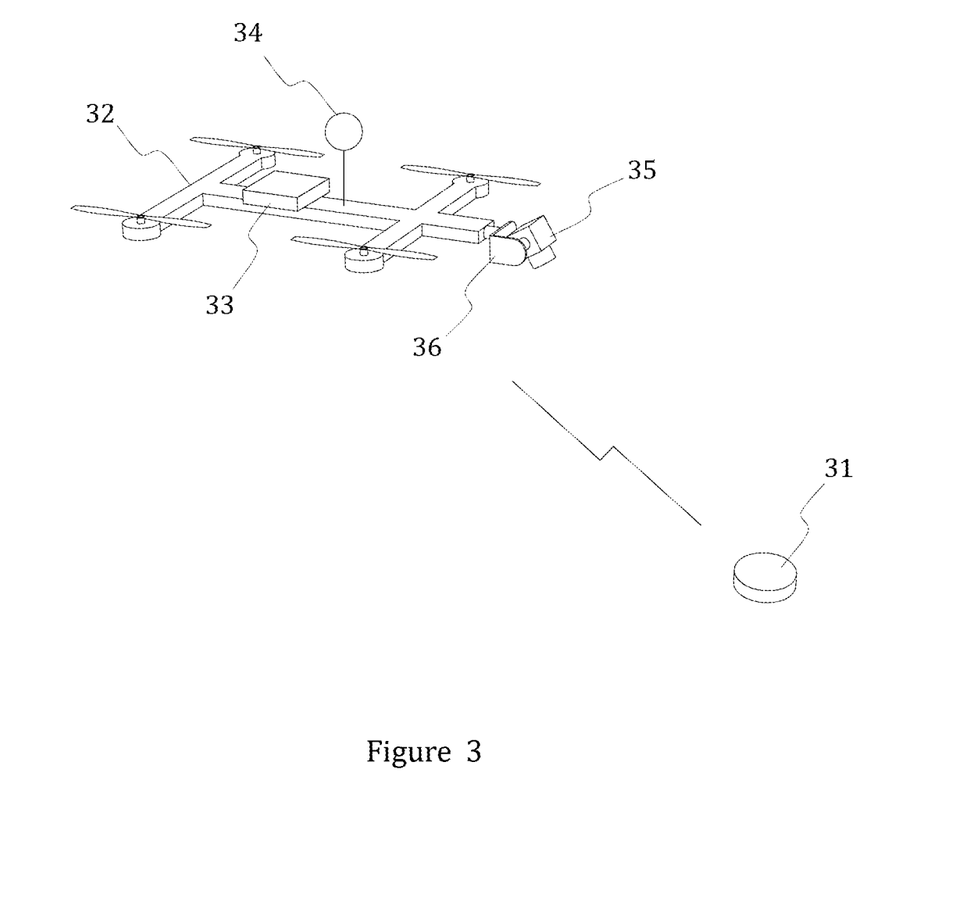
FIG. 3 shows a simplified, exemplary embodiment of a tracking arrangement according to the present disclosure.

FIG. 3 shows a simplified, exemplary embodiment of a tracking arrangement according to the present disclosure. The tracking arrangement in FIG. 3 comprises a tracking beacon unit 31 according to the present disclosure and a UAV 32 comprising a self-positioning system 33 according to the present disclosure. In FIG. 3, the UAV is a quadcopter.

The self-positioning system of UAV 32 comprises a single omnidirectional antenna array 34, a radio-frequency transceiver unit, a barometer, and a processing unit. The tracking beacon unit 31 comprises a transmitter configured to emit the radio wave tracking beacon signal received by the antenna array 34, a barometer, and a radio-frequency transceiver unit that is complementary to the radio-frequency transceiver unit of the self-positioning system of the UAV 32.

The antenna array 34 is configured to receive the tracking beacon signal from the tracking beacon unit 31, and the processing unit of the self-positioning system is configured to estimate the direction of arrival of the tracking beacon signal.

The radio-frequency transceiver unit of the self-positioning system 33 is configured to communicate with the radio-frequency transceiver of the tracking beacon unit 31 in order to provide the estimate of Euclidian distance between the self-positioning system and the tracking beacon unit. The radio-frequency transceiver of the self-positioning system 33 may further be configured to receive the atmospheric pressure data from the counterpart radio-frequency transceiver of the tracking beacon unit 31. Both the UAV 32 and the tracking beacon unit 31 comprise a barometer that is configured to produce the atmospheric pressure data on atmospheric pressures at the locations of the self-positioning system and the tracking beacon unit.

The processing unit of the self-positioning system 33 of UAV 32 is configured to estimate a height difference between the self-positioning system 33 and the tracking beacon unit 31 based on the atmospheric pressures of the self-positioning system 33 and the tracking beacon unit 31, and to determine position data identifying a three-dimensional position of the self-positioning system 33 with respect to tracking beacon unit 31 on the basis of the estimates of the direction of arrival, the height difference, and the Euclidian distance. Sensor fusion can be utilised to provide added redundancy in the form of selection logic based on the plurality of measurements as described in the present disclosure. Further, sensor fusion calculations can be utilised to improve, for example, the accuracy of the height estimate. Suitable sensor fusion algorithms, for example Kalman filter, can be used to fuse the estimated height difference obtained from the barometers of the self-positioning system and the tracking beacon unit, and the height difference estimate determined from the elevation angle and the Euclidian distance provided by the self-positioning system. For example, in the self-positioning system 33, the processing unit system may be configured to calculate a sensor-fusion-enhanced estimate of the height difference based on a first estimate of height difference calculated from the atmospheric pressures and a second estimate of the height difference calculated based on the estimates of the elevation angle and the Euclidian distance, and determine the position data based on the estimates of the direction of arrival, the Euclidian distance, and the sensor-fusion-enhanced height difference.

In some embodiments, more than two measurements can be fused, for example, to further improve the accuracy of the height estimate three measurements can be fused provided that both the self-positioning system and the tracking beacon comprise inertial navigation units capable of determining acceleration in the vertical direction i.e. acceleration parallel to the direction of gravity. Suitable sensor fusion algorithm, for example a Kalman filter, can then be used to fuse the vertical acceleration difference estimate obtained from the inertial navigation units, the estimated height difference obtained from the barometers, and the height difference estimate determined from the elevation angle and the Euclidian distance provided by the self-positioning system.

For example, in FIG. 3, the self-positioning system 33 may comprise a barometer and an inertial navigation unit configured to determine vertical acceleration of the self-positioning system. The radio-frequency transceiver of the system 33 may be configured to receive atmospheric pressure data and vertical acceleration data of the tracking beacon unit 31 from the tracking beacon unit. The processing unit of the system 33 may estimate a vertical acceleration difference between the self-positioning system and the tracking beacon unit based on the acceleration data of the self-positioning system and the tracking beacon unit. Further, the processing unit may determine a first height difference estimate between the self-positioning system and the tracking beacon unit based on the elevation angle and the Euclidian distance, and a second height difference estimate based on the atmospheric pressures. The processing system may then calculate a sensor-fusion-enhanced estimate of the height difference based on the vertical acceleration difference, the first height difference estimate, and the second height difference estimate.

The UAV 32 in FIG. 3 further comprises a camera 35 mounted on a gimbal 36 and at least one acceleration sensor, a gyroscope and/or a compass of the unmanned vehicle configured to produce geographic orientation data and vertical and horizontal acceleration data. The UAV 32 may be configured to track the tracking beacon unit 31 or a fixed position with respect to the tracking beacon unit 31 on the basis of the position data determined by the self-positioning system 33 and the geographic orientation data produced by the at least one acceleration sensor, the gyroscope and/or the compass.

While FIG. 3 shows a quadcopter, implementations of the positioning systems or unmanned aerial vehicles according to the present disclosure are not limited to quadcopters. The self-positioning system can be applied to virtually any unmanned aerial vehicle suitable for following a target at a close proximity.

The tracking beacon unit 31 may also be implemented in various ways. For example, the tracking beacon unit 31 may be in the form of a wearable tag, such as a bracelet or a wristband to be worn in the wrist of the user. The tracking beacon unit 31 may also comprise a user interface, such as a display and control buttons, for giving commands to the UAV 32. The tracking beacon unit 31 may also be a unit that is detachably attachable to a surface by magnets, suction cups, adhesive or other detachable means, for example. Such an attachable unit may be attached to a vehicle in order to enable tracking of the vehicle.

Figure 4:
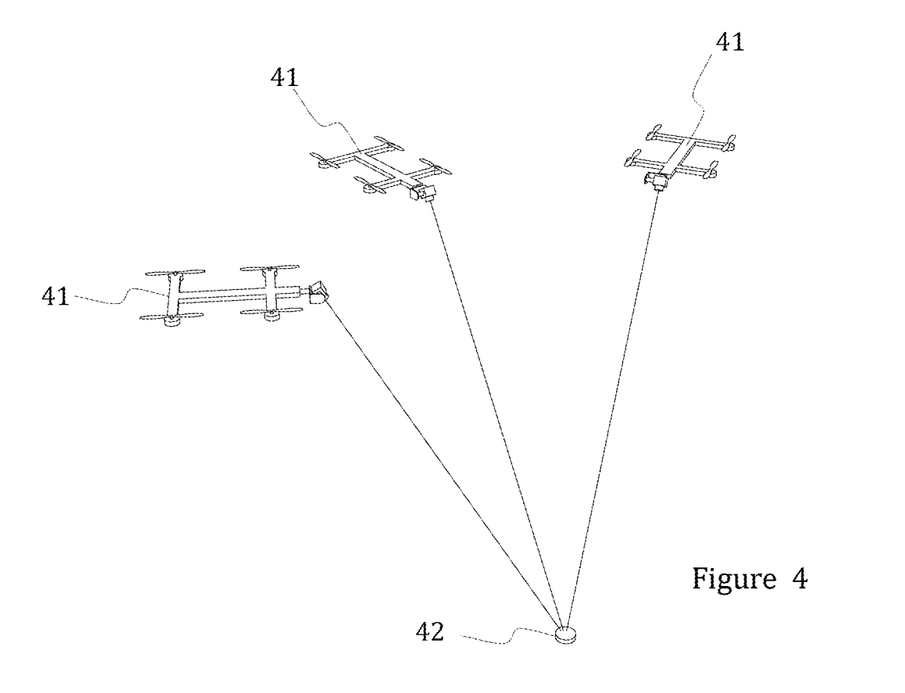
FIG. 4 shows an example of three such UAVs tracking a tracking beacon unit.

A self-positioning system according to the present disclosure also allows applications with a plurality of unmanned vehicles. A plurality of unmanned vehicles with a self-positioning system may track the same tracking beacon unit. For example, two or more UAVs, each comprising a camera and a self-positioning system according to the present disclosure, may be configured to capture images or video of the same target from different angles. FIG. 4 shows an example of three such UAVs 41 tracking a tracking beacon unit 42.

Each unmanned vehicle in the plurality of unmanned vehicles may be configured to receive position information from self-positioning systems of other unmanned vehicles in order to avoid collisions and/or to maintain a desired formation. In this manner, the unmanned vehicles may act as a controlled swarm.

In some embodiments, the radio-frequency transceivers of the self-positioning systems of the unmanned vehicles may be configured to determine distances between each two unmanned vehicles in addition to the distances between the unmanned vehicles and the tracking beacon unit. In this manner, the formation of the unmanned vehicles can be determined (e.g. by trilateration). This information can be used to supplement the position data originating from the self-positioning units, thereby increasing reliability of the system.

Figure 5:
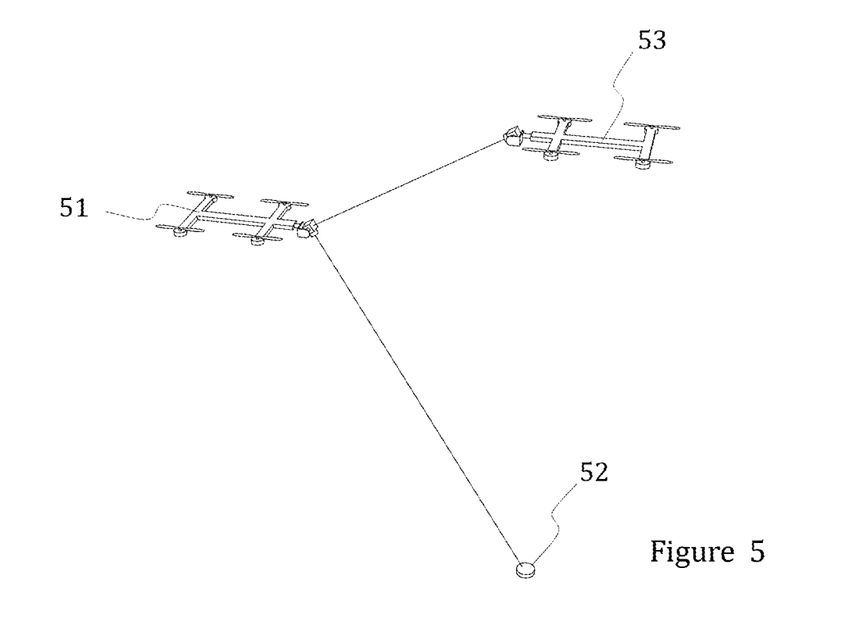
FIG. 5 shows and example of UAVs tracking each other.

Further, in some embodiments, each unmanned vehicle may further comprise a tracking beacon unit according to the present disclosure. The formation of the unmanned vehicles may then be determined (e.g. by triangulation) based on the directions of arrivals of the tracking beacon signals from each tracking beacon to each self-positioning unit. Alternatively, or in addition, each unmanned vehicle can use tracking beacon units of the other unmanned vehicles as targets for its self-positioning unit. In other words, an unmanned vehicle with a self-positioning system according to the present disclosure may be configured to track another unmanned vehicle. FIG. 5 shows and example of a first UAV 51 with a self-positioning system according to the present disclosure tracking a tracking beacon unit 52. The first UAV 51 carries another tracking beacon unit, and a second UAV 53 tracks this tracking beacon unit, and therefore, the first UAV 51.

When a plurality of unmanned vehicles comprises both the self-positioning system and the tracking beacon unit, each vehicle can be configured to track another vehicle. The roles of the vehicles (i.e. which vehicle is tracking and which vehicle is being tracked) can be changed on the fly.

While the above discussion relates mostly to vehicles that are able to change their position, the method and system according to the present disclosure is also applicable to devices that can reorient themselves or otherwise change their posture. For example, a display (e.g. computer display or a video screen) that has electric motors for changing the direction the display is facing may also comprise a system according to the present disclosure. In this manner, the display is able to automatically orient itself to always face a target, such as a person, carrying a tracking beacon unit according to the present disclosure. In some applications, a robotic arm with a system according to the present disclosure may be configured to manipulate targets with tracking beacon units according to the present disclosure.

Further, while advantages in reliability, accuracy and fault tolerance can be achieved with the redundancy in the self-positioning system as explained above, a self-positioning system can be operated with less redundancy. For example, in order to simplify the self-positioning system, the system may not comprise a barometer unit, and the self-positioning system may perform all other steps discussed above except those related to utilization of atmospheric pressure data. A tracking beacon unit without a barometer unit can be used together with such a self-positioning system.

The self-positioning system (that does not use atmospheric pressure data) may be configured to estimate an direction of arrival of a radio wave tracking beacon signal arriving at an antenna array of the unmanned vehicle from a tracking beacon unit, estimate Euclidian distance between the self-positioning system and the tracking beacon unit by using wireless radio-frequency communication between the self-positioning system and the tracking beacon unit, and determine position data identifying a three-dimensional position of the self-positioning system with respect to the tracking beacon unit on the basis of the estimates of the direction of arrival and the Euclidian distance. Sensor fusion can be utilised to improve the accuracy of the height estimate provided that both the self-positioning system and the tracking beacon comprise inertial navigation units capable of determining acceleration in the vertical direction i.e. acceleration parallel to the direction of gravity. Suitable sensor fusion algorithm, for example a Kalman filter, can then be used to fuse the vertical acceleration difference estimate obtained from the inertial navigation units and the height difference estimate determined from the elevation angle and the Euclidian distance provided by the self-positioning system. For example, a self-positioning system according to the present disclosure may be configured to wirelessly receive acceleration data from the tracking beacon unit, where said acceleration data indicates vertical acceleration of the tracking beacon unit, determine vertical acceleration data of the self-positioning system, and determine a vertical acceleration difference between the self-positioning system and the tracking beacon unit based on the acceleration data of the self-positioning system and the tracking beacon unit. The self-positioning system may also determine a height difference estimate between the self-positioning system and the tracking beacon unit based on the direction of arrival and the Euclidian distance, and then calculate a sensor-fusion-enhanced height difference estimate based on the acceleration difference and the height difference estimate determined based on the elevation angle and the Euclidian distance. The position data may then be determined based on the estimates of the direction of arrival, the Euclidian distance, and the sensor-fusion-enhanced height difference.

A self-positioning system that does not use atmospheric pressure data can be used in a similar way as a system that uses atmospheric pressure data. A system without barometers may be used in an UAV, for example. A self-positioning system that does not use atmospheric pressure data may be configured to maintain awareness of geographic orientation of the self-positioning system based on the determined three-dimensional position and orientation data originating from at least one acceleration sensor, a gyroscope, and/or a compass.

It is obvious to a person skilled in the art that the self-positioning system and tracking beacon unit can be implemented in various ways. The invention and its embodiments are not limited to the examples described above but may vary within the scope of the claims.

The invention claimed is:

1. A self-positioning system of a vehicle, wherein the self-positioning system is configured to
   estimate a direction of arrival of a radio wave tracking beacon signal arriving at an antenna array of the vehicle from a tracking beacon unit,
   estimate Euclidian distance between the self-positioning system and the tracking beacon unit by using wireless radio-frequency communication between the self-positioning system and the tracking beacon unit,
   wirelessly receive acceleration data from the tracking beacon unit, wherein said acceleration data indicates vertical acceleration of the tracking beacon unit,
   determine vertical acceleration data of the self-positioning system,
   determine a vertical acceleration difference between the self-positioning system and the tracking beacon unit based on the acceleration data of the self-positioning system and the tracking beacon unit, and
   determine a first height difference estimate between the self-positioning system and the tracking beacon unit based on the direction of arrival and the Euclidian distance,
   calculate a sensor-fusion-enhanced height difference estimate based on the acceleration difference and the first height difference estimate, and
   determine position data identifying a three-dimensional position of the self-positioning system with respect to tracking beacon unit based on the estimate of the direction of arrival, the estimate of the Euclidian distance, and the sensor-fusion-enhanced height difference.

2. A self-positioning system according to claim 1, wherein the self-positioning system is configured to
   wirelessly receive atmospheric pressure data from the tracking beacon unit, wherein said atmospheric pressure data indicates atmospheric pressure at the location of the tracking beacon unit,
   determine atmospheric pressure at the location of the self-positioning system,
   estimate a second height difference between the self-positioning system and the tracking beacon unit based on the atmospheric pressures at the locations of the self-positioning system and the tracking beacon unit, and
   calculate a sensor-fusion-enhanced height difference estimate based on the acceleration difference, the first height difference estimate determined based on the elevation angle, and the second height difference,
   determine the position data based on the estimate of the direction of arrival, the estimate of the Euclidian distance, and the sensor-fusion-enhanced height difference estimate.

3. A self-positioning system for a vehicle, wherein the self-positioning system comprises
   an antenna array configured to receive the tracking beacon signal from a tracking beacon unit,
   a radio-frequency transceiver configured to communicate with a radio-frequency transceiver of the tracking beacon unit in order to provide an estimate of Euclidian distance between the self-positioning system and the tracking beacon unit,
   a barometer configured to determine the atmospheric pressure at the location of the self-positioning system,
   the radio-frequency transceiver is configured to receive the atmospheric pressure data from the tracking beacon unit to the self-positioning system, and
   a processing unit configured to
      estimate the direction of arrival of the tracking beacon signal,
      estimate a first height difference between the self-positioning system and the tracking beacon unit based on the atmospheric pressure data on atmospheric pressures at the locations of the self-positioning system and the tracking beacon,
      calculate a sensor-fusion-enhanced height difference estimate based on the first estimate of height difference and a second estimate of the height difference calculated based on the estimates of the elevation angle and the Euclidian distance, and
      determine position data identifying a three-dimensional position of the self-positioning system with respect to tracking beacon unit based on the estimate of the direction of arrival, the estimate of the Euclidian distance, and the sensor-fusion-enhanced height difference estimate.

4. A self-positioning system for a vehicle, wherein the self-positioning system comprises
   an antenna array configured to receive the tracking beacon signal from a tracking beacon unit,
   a radio-frequency transceiver configured to communicate with a radio-frequency transceiver of the tracking beacon unit in order to provide an estimate of Euclidian distance between the self-positioning system and the tracking beacon unit,
   an inertial navigation unit configured to determine vertical acceleration of the self-positioning system, the radio-frequency transceiver is configured to receive vertical acceleration data of the tracking beacon unit from the tracking beacon unit to the self-positioning system, and a processing unit configured to
- estimate the direction of arrival of the tracking beacon signal,
- estimate a vertical acceleration difference between the self-positioning system and the tracking beacon unit based on the acceleration data of the self-positioning system and the tracking beacon unit,
- determine a first height difference estimate between the self-positioning system and the tracking beacon unit based on the direction of arrival and the Euclidian distance,
- calculate a sensor-fusion-enhanced height difference estimate based on the acceleration difference and the first height difference,
- determine the position data based on the estimate of the direction of arrival, the estimate of the Euclidian distance, and the sensor-fusion-enhanced height difference estimate.

5. A self-positioning system according to claim 4, wherein the self-positioning system further comprises a barometer configured to determine the atmospheric pressure at the location of the self-positioning system, the radio-frequency transceiver is further configured to receive the atmospheric pressure data from the tracking beacon unit to the self-positioning system, and the processing unit system is configured to
- calculate a sensor-fusion-enhanced estimate of the height difference based on the vertical acceleration difference, the first height difference estimate, and a second height difference calculated from the atmospheric pressures.

6. A tracking arrangement, wherein the tracking arrangement comprises a vehicle with a self-positioning system, wherein the self-positioning system comprises an antenna array configured to receive the tracking beacon signal from a tracking beacon unit, a radio-frequency transceiver configured to communicate with a radio-frequency transceiver of the tracking beacon unit in order to provide an estimate of Euclidian distance between the self-positioning system and the tracking beacon unit, a barometer configured to determine the atmospheric pressure at the location of the self-positioning system, the radio-frequency transceiver is further configured to receive the atmospheric pressure data from the tracking beacon unit to the self-positioning system, an inertial navigation unit configured to determine vertical acceleration of the self-positioning system, the radio-frequency transceiver is configured to receive vertical acceleration data of the tracking beacon unit from the tracking beacon unit to the self-positioning system, and a processing unit configured to
- estimate the direction of arrival of the tracking beacon signal,
- estimate a vertical acceleration difference between the self-positioning system and the tracking beacon unit based on the acceleration data of the self-positioning system and the tracking beacon unit,
- determine a first height difference estimate between the self-positioning system and the tracking beacon unit based on the elevation angle and the Euclidian distance,
- calculate a sensor-fusion-enhanced height difference based on the vertical acceleration difference, the first height difference, and a second height difference calculated from the atmospheric pressures,
- determine position data identifying a three-dimensional position of the self-positioning system with respect to tracking beacon unit based on the estimates of the direction of arrival, the Euclidian distance, and the sensor-fusion-enhanced height difference.

7. A tracking arrangement according to claim 6, wherein the vehicle is an unmanned aerial vehicle.

8. A tracking arrangement according to claim 6, wherein the arrangement further comprises a wearable tracking beacon unit configured to
- emit a radio wave tracking beacon signal to be received by an antenna array of a self-positioning system,
- wirelessly transmit atmospheric pressure data on atmospheric pressure at the location of the tracking beacon unit to the self-positioning system, and
- wirelessly communicate with the self-positioning system in order to determine Euclidian distance between the self-positioning system and the tracking beacon unit.

* * * * *